United States Patent [19]

Bruggmann et al.

[11] Patent Number: 4,796,414
[45] Date of Patent: Jan. 10, 1989

[54] INSTALLATION AND METHOD FOR PRODUCING AN OPTICAL CONDUCTOR

[75] Inventors: Remy Bruggmann, Brent; Philipp De Boer, Nyon, both of Switzerland

[73] Assignee: Maillefer S.A., Switzerland

[21] Appl. No.: 68,066

[22] Filed: Jun. 30, 1987

[30] Foreign Application Priority Data

Jul. 3, 1986 [CH] Switzerland ............... 02719/86

[51] Int. Cl.⁴ .................. G02B 6/04; H01B 13/02; D01H 7/00
[52] U.S. Cl. ........................... 57/6; 57/9; 57/13; 57/66; 57/293
[58] Field of Search ............... 57/3, 6, 9, 13, 14, 57/314, 66, 293, 294

[56] References Cited

U.S. PATENT DOCUMENTS

| | | | |
|---|---|---|---|
| 4,154,049 | 5/1979 | King et al. | 57/9 |
| 4,446,686 | 5/1984 | Panuska et al. | 57/6 |
| 4,587,801 | 5/1986 | Missout et al. | 57/9 X |
| 4,620,412 | 11/1986 | Portinari | 57/6 |

*Primary Examiner*—John Petrakes
*Attorney, Agent, or Firm*—Parkhurst, Oliff & Berridge

[57] ABSTRACT

A grooved cylindrical core or rod is conveyed in a state of elastic elongation, giving it excess length, through a distributing device and a die-plate. Optical fibers are each fitted in a respective groove of the rod at the entry of the die-plate. Downstream from the die-plate, the rod provided with the fibers passes through a zone in which there is a powerful electric field created by a ionization bar. Under the influence of the ionization, the fibers cling to the walls or bottoms of the grooves. This provides the drag necessary for stretching the fibers when they approach the rod.

14 Claims, 3 Drawing Sheets

INSTALLATION AND METHOD FOR PRODUCING AN OPTICAL CONDUCTOR

This invention relates to fiber optics, and more particularly to an installation for fitting a group of optical fibers into longitudinal grooves of a cylindrical core or rod. The invention further relates to a method of producing an optical conductor having a grooved cylindrical core or rod with an assembly of optical fibers, each accommodated in one groove of the rod with a predetermined excess length, of the type wherein a predetermined section of the rod is continuously subjected to tensile stress to impart to it an elastic elongation, and the fibers are fitted into the grooves at a fixed point of this section. Finally, the invention also relates to an optical conductor produced by the foregoing method.

Optical fibers must be inserted in plastic guide elements which encase and protect them, these fibers being disposed in the respective elements with a certain excess length to avoid their being subjected to stresses liable to break them if the guide element undergoes tensile stress and hence stretching while being handled, especially while being laid, or under the influence of thermal conditions.

To overcome this difficulty, it has been proposed to use a grooved rod, i.e., a cylindrical support core having grooves on its periphery, for encasing and guiding the fibers. The grooves are preferably disposed helically, and each is dimensioned to contain one optical fiber with excess length, which may amount to from 0 to 0.3%. This excess length is imparted to the fiber upon its insertion in the groove by momentarily subjecting the cylindrical core to tensile stress, which stretches it to the desired extent. When the cylindrical core is released, it contracts, and this gives the fiber its excess length.

However, when a grooved cylindrical core is paid out from a reel, then driven between two capstans which subject it to the desired traction, it may happen that under the effect of the tension exerted on the fiber to insert it in the groove of the core, the downstream part of the optical conductor retracts within the groove, and this leads to a loss of the required excess length. It must, in fact, be borne in mind that the coefficient of friction between the fiber and the bottom of the groove in the cylindrical core is very low.

It is therefore an object of this invention to provide an improved installation and method having means for immobilizing each fiber in its groove at least momentarily in order to prevent it from being pulled backward at the time of assembly.

To this end, the installation according to the present invention comprises two capstans having parallel axes, capable of conducting a cylindrical core or rod so that it travels continuously and under a fixed elastic tension along a predetermined straight section, capstan-supporting means and optical-fiber payout reels arranged to produce a relative rotary movement between the fibers as a whole and the section of rod about the axis of the latter, and means adjacent to the point of entry of the fibers into the grooves for causing the fibers to adhere at least momentarily to the walls of the gooves.

In the method according to the present invention, of the type initially mentioned, there is established adjacent to the point of entry of the fibers an electric field suitable for imparting to the fibers and to the rod different states of ionization and thus creating an electrostatic force immobilizing the fibers in the grooves.

A preferred embodiment of the invention will now be described in detail with reference to the accompanying drawings, in which.

Figure 1:
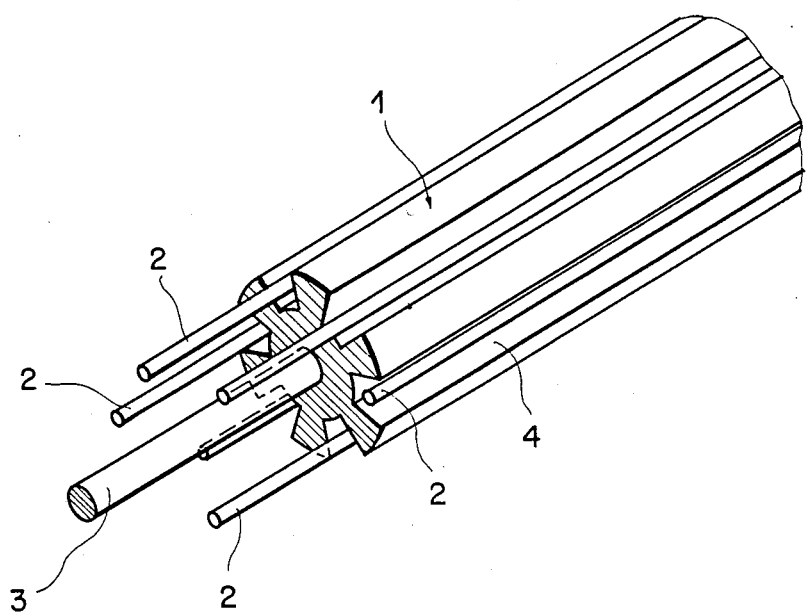
FIG. 1 is a diagrammatic perspective view, in section, of an optical conductor.
Figure 2A:
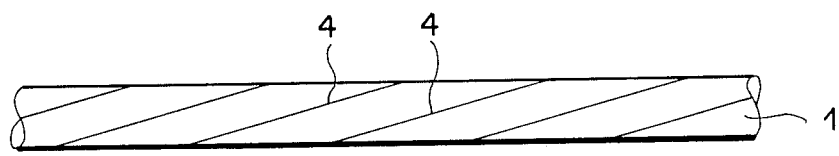
FIGS. 2a and 2b are diagrammatic elevations showing two modifications of the grooves in the cylindrical core of the conductor of FIG. 1.

Depicted in FIG. 1 is a cylindrical core or rod 1, which is an elongated element of plastic having a circular cross-section, intended to hold six optical fibers 2 and to guide them while avoiding any tensile stress on these fibers. In the center of rod 1 is a cylindrical passage through which a central wire 3 passes. Rod 1 has in its peripheral surface six grooves 4 of trapezoidal cross-section, each intended to hold one of the fibers 2. It will be seen that the cross-section of each groove 4 is appreciably larger than the cross-section of a fiber 2, so that the latter lies loosely in the groove between its walls. In the diagrammatic view of FIG. 1, grooves 4 are parallel to the axis of rod 1; but preferably, as may be seen in FIGS. 2a and 2b, grooves 4 are disposed in spirals. In the example of FIG. 2a, grooves 4 follow a uniform-pitch spiral and are all parallel.

Figure 2B:
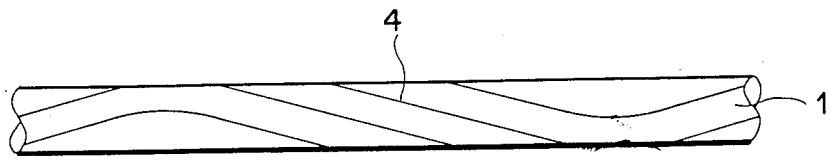

In the modification of FIG. 2b, on the other hand, the course of the grooves is periodic, the direction of development of the lines spiralling around the cylindrical core or rod being periodically alternated (SZ appearance).

Figure 3:
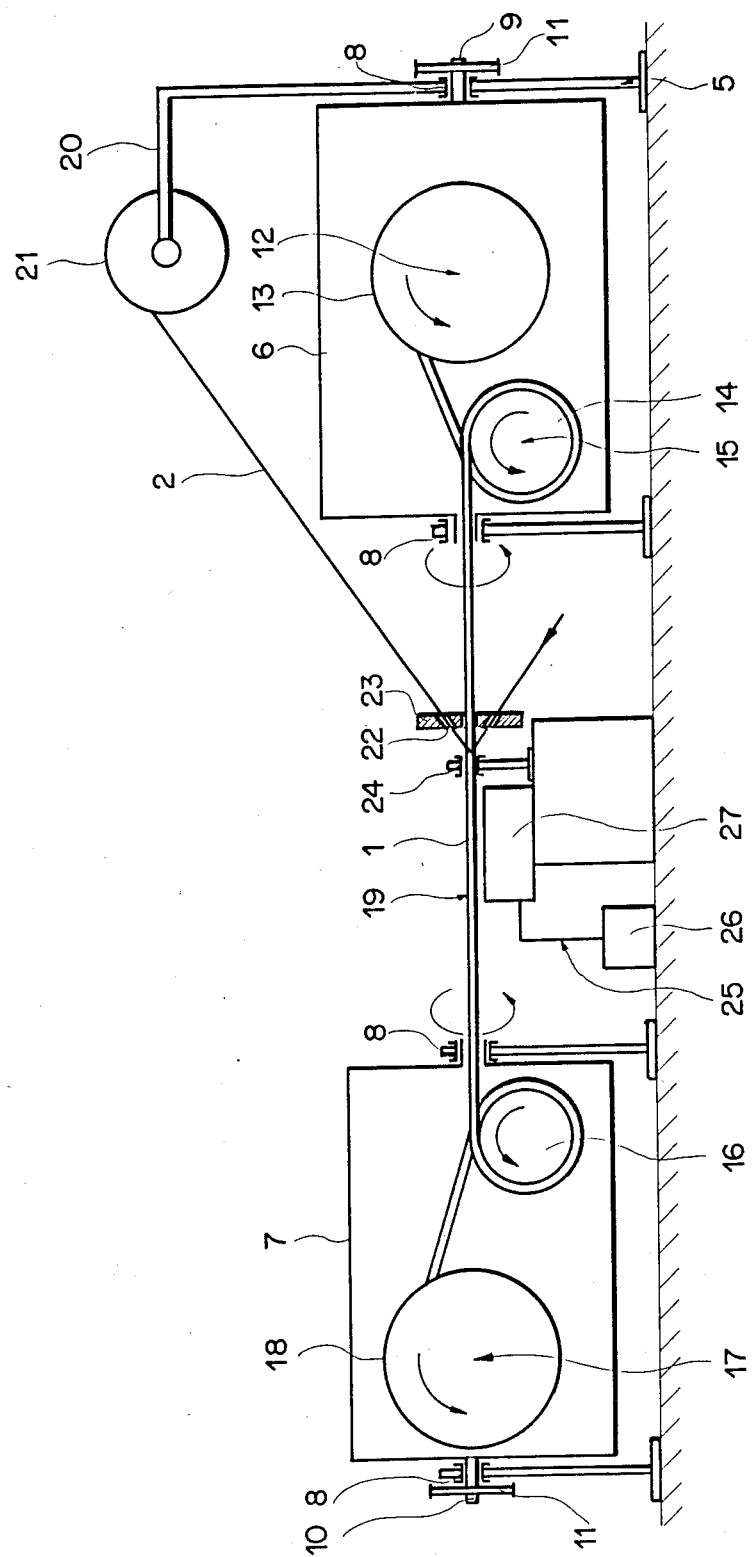
FIG. 3 is a diagrammatic overall elevation of the installation intended for carrying out the method.

FIG. 3 shows diagrammatically an installation for carrying out the method. This installation comprises a main support 5 with two uprights holding a first rotating cage 6 and two other uprights holding a second rotating cage 7. These two cages are supported on bearings 8 and rotate about a common axis. Each cage bears at the end of its secondary shaft 9 or 10 a pulley 11 via which it can be driven rotatingly by a motor (not shown). The first cage 6 bears a payout apparatus 12 having a reel 13 and a capstan 14 which rotates about an axis 15 perpendicular to the main axis of the installation. Capstan 14 is driven by a motor (not shown) mounted on cage 6. As for cage 7, it similarly bears a pulling capstan 16 having an axis parallel to that of capstan 14 and likewise driven by a motor mounted in cage 7. The latter further bears a take-up apparatus 17 on which a receiving reel 18 is mounted. It is readily apparent that capstans 14 and 16 can be driven by their respective motors at speeds regulated in such a way that a section 19 of rod 1 extending between the two capstans runs from cage 6 to cage 7 under a predetermined tensile stress T. This stress is regulated so that rod 1 has an elastic elongation ΔL in the section thereof situated between the two capstans, whereas the real distance between them is L. Moreover, cages 6 and 7 may be rotated about the main axis of the installation in a manner and at a speed corresponding to the arrangement of the helical grooves 4. When rod 1 has grooves 4 with uniform pitch (FIG. 2a), the speed of cages 6 and 7 will be constant and synchronized with that of capstans 14 and 16 as a function of the pitch of grooves 4.

The machine illustrated in FIG. 3 produces cables of the type shown in FIG. 2a. In another embodiment also corresponding to that type, the feed device as a whole, capable of guiding the fibers and to be described below, might also be mounted for rotation about the main axis, take-up apparatus 17 then being mounted on an axis having a stationary orientation.

However, it is also possible to envisage mounting the feed device and the take-up apparatus on axes having stationary orientation. The machine then comprises an intermediate cage with the two capstans 14 and 16, rotated periodically first in one direction and then the other. This modification is intended for producing a cable of the type shown in FIG. 2b. This kind of SZ assembler may also be provided with the improvement constituting the main subject-matter of the present invention.

The feed device will now be described. The main support 5 comprises around cage 6 a series of reel-holders 20, one of which is depicted in FIG. 3. Each of these reel-holders 20 is equipped with a reel 21 on which an optical fiber 2 is wound. From reels 21, fibers 2 are pulled toward rod 1. They pass through a guide hole 22 in a guide membrane 23 through which rod 1 also passes, while a point C where fibers 2 enter grooves 4 is determined by a die-plate 24.

Figure 4:
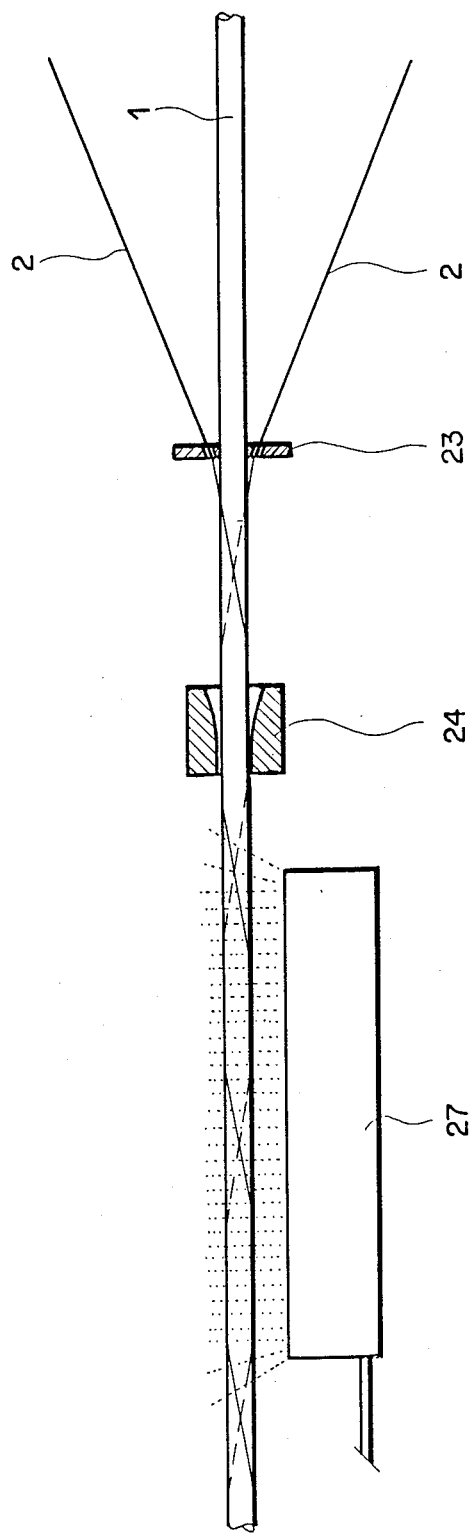
FIG. 4 is another diagrammatic elevation, on a larger scale, showing the arrangement of an ionizer bar in the installation of FIG. 3.

As stated above, the section of each fiber 2 between die-plate 24 and reel 21 must be straight so that the fiber is necessarily subjected to a tensile stress F giving it an elongation which, though minute, is nevertheless other than zero. However, in order for tension F to exist, the fiber must obviously be subjected, in the portion of rod 1 which passes onto capstan 16 and reel 18, to a retaining force which can be transmitted to it only by the walls of the groove 4 in which it is fitted. Now, it has been found that the coefficient of friction between the fiber and the plastic material of which rod 1 is made is extraordinarily low. As a matter of fact, in practice, there is difficulty in bringing about tensile stress F. To overcome this difficulty, the present installation comprises, opposite the section of rod 1 situated immediately downstream from die-plate 24, an ionizer device 25. This device may take various forms. In particular, it may comprise an electrostatic generator 26 and a charge bar 27 consisting of an elongated cylindrical mass, insulated from ground, which is kept by generator 26 under a predetermined electrostatic potential. FIG. 4 shows in more detail the action of charge bar 27. It creates in its environment, and especially in the zone through which rod 1 passes, a powerful electric field. The effect of this field is to cause ionization phenomena which put the fibers and the grooved cylindrical core or rod in different states of charge due to the differences in the properties of the materials of which they are made. As a result, each fiber 2 adheres to the groove 4 in which it has been inserted. The adhesion thus created resists a certain amount of force, and this provides the required drag. Thus, it is possible to stretch fibers 2 between payout reels 21 and die-plate 24 under force F and thus to ensure proper insertion of these fibers in grooves 4. As rod 1 is elastically elongated under the effect of force T when it passes between capstans 14 and 16 and loses its elongation as soon as it leaves capstan 16 in the direction of reel 18, it undergoes a shortening at that point, thus giving fibers 2 the required excess length. The electrostatic charge caused by the ionization phenomenon in the electric field of charge bar 27 disappears after a certain time and leaves no trace in the finished cable.

It will be understood that in the case of grooves spiralling at a uniform pitch, payout and take-up reels 13 and 18 must necessarily be mounted on rotary cages 6 and 7 and that the optical conductor can be produced only in sections of a certain length. In the case of a cylindrical core having SZ grooving, on the other hand, reels 13 and 18 may be installed on support 5 outside the cages, thus making it possible to produce very long optical conductor elements all in one piece. In both these embodiments, the presence of an electrostatic generator and an ionizer near the point of entry of the fibers into the grooves has made it possible to improve appreciably the qualities of the optical conductors, and especially to obtain a conductor in which the fibers actually do have a predetermined excess length. This excess length eliminates the negative effects formerly observed on the optical properties of fiber optic conductors, for the entire life of a cable, and decreases the risk of breakage of the fibers when the cable is handled. The arrangement described allows an increase in the speed of travel of the grooved cylindrical core and of the fibers, and consequently in the profitability of the installation.

What is claimed is:

1. An installation for fitting a group of optical fibers into longitudinal grooves of a rod, comprising:
    two capstans having parallel axes, capable of moving said rod continuously along a predetermined straight section of path and for applying to said rod a fixed elastic tension within said section,
    capstan-supporting means and optical-fiber payout reels for producing a relative rotary movement about the axis of said rod between said fibers as a whole and the portion of said rod within said section, and
    means, disposed adjacent to the point of entry of said fibers into said grooves, for causing said fibers to adhere at least momentarily to the walls of said grooves, said means for causing said fibers to adhere comprising an ionizer device disposed between said capstans in proximity to said rod.

2. The installation of claim 1, further comprising a support rotatable about an axis and bearing said two capstans spaced from one another, and means for driving said capstans rotatingly, each about its own axis and at speeds regulated in phase and in magnitude, whereby said rod is subjected within said section of path between said capstans to a predetermined tensile stress, said means for causing said fibers to adhere being situated downstream from said point of entry.

3. The installation of claim 1, wherein said ionizer device comprises an electrostatic voltage generator and, in proximity to said rod, an electrostatic charge bar connected to said generator.

4. A method of producing an optical conductor having a grooved rod with an assembly of optical fibers, each accommodated in one groove of the rod with a predetermined excess length, comprising the steps of continuously subjecting the rod to a first tensile stress over a predetermined section to impart to it an elastic elongation, and fitting the fibers into the grooves at a fixed point of the predetermined section, wherein the improvement comprises the further step of establishing adjacent to the point of entry of the fibers an electric field suitable for imparting to the fibers and to the rod different states of ionization and thus creating an electrostatic force for immobilizing the fibers in the grooves.

5. The method of claim 4, comprising the further step of subjecting the fibers to a second tensile stress while fitting them into the grooves for conferring upon the fibers an elongation smaller than that deriving from the first tensile stress exerted upon the rod.

6. The method of claim 5, comprising the further step of passing the rod over two capstans, the rotation of the capstans being synchronized in speed and in phase for driving the rod along the predetermined section between the capstans at a predetermined speed and under the first tensile stress.

7. The method of claim 4, comprising the further step of passing the rod over two capstans, the rotation of the capstans being synchronized in speed and in phase for driving the rod along the predetermined section between the capstans at a predetermined speed and under the first tensile stress.

8. The method of claim 4, wherein the rod is helically grooved, the rod being rotated about the straight axis of the predetermined section.

9. The method of claim 8, wherein the rotation takes place continuously and at a constant speed, the grooves being disposed along spirals of uniform pitch.

10. The method of claim 8, wherein the direction of rotation is periodically alternated, the grooves being disposed along spirals of alternating direction (SZ).

11. An installation for manufacturing an optical fibers cable comprising a core with helical grooves having parallel walls therein and with optical fibers loosely encompassed between said walls, said installation comprising a pay-out device delivering said core, at a given speed, feeding means for freely delivering said optical fibers, dispensing means for causing said optical fibers to enter said grooves, a take-up device for said core having said fibers in said grooves, and driving means for both said pay-out and take-up devices, said dispensing means being located between said pay-out and take-up devices, said driving means being arranged for permanently subjecting a section of said core extending between said devices to an elastical elongation $\Delta L/L$, and said installation further comprising an adhering device located outwardly of said core, acting on said core and said fibers and at least temporarily adhering said fibers to the walls of said grooves during the travel of said cable from said dispensing means to said take-up device.

12. An installation as claimed in claim 1, wherein said adhering device is located immediately downstream from said dispensing means and is arranged for causing at said location an adhesion able to last during a time period corresponding to at least said travel.

13. The installation of claim 11, wherein said adhering device comprises an ionizer device.

14. The installation of claim 13, wherein said ionizer device comprises an electrostatic voltage generator and, in proximity to said core, an electrostatic charge bar connected to said generator.

* * * * *